N. S. WILLIAMS.
METALLIC PACKING FOR PISTONS.
APPLICATION FILED FEB. 21, 1918.
1,290,819.
Patented Jan. 7, 1919.
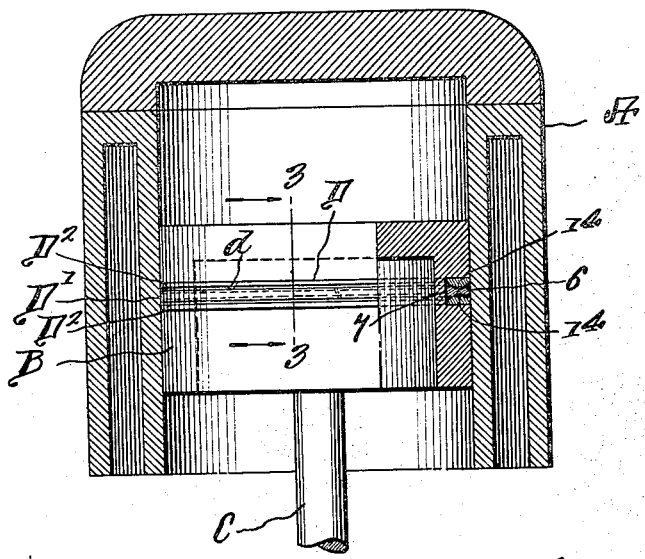
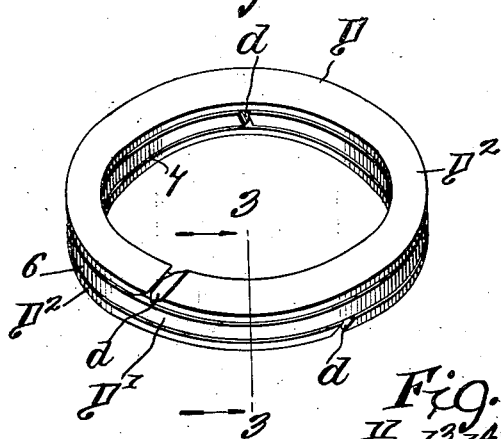
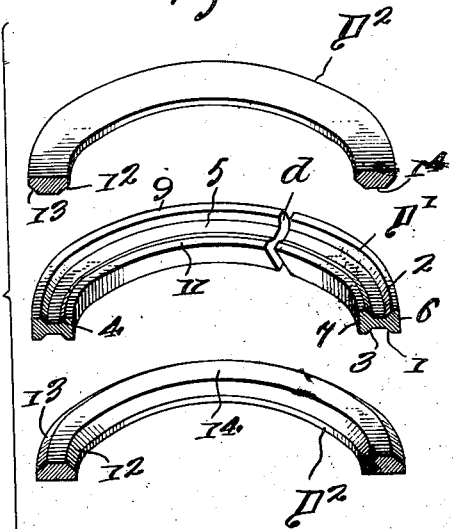
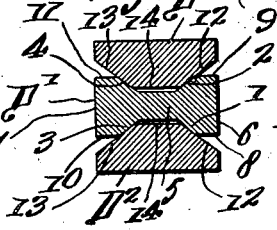
Witness
Edwin J Beller
Inventor
N. S. Williams.
by J. E. Hunter.
Attorney.

UNITED STATES PATENT OFFICE.

NOLAN S. WILLIAMS, OF EL PASO, TEXAS, ASSIGNOR TO VICTORY PISTON RING MFG. CO., OF EL PASO, TEXAS.

METALLIC PACKING FOR PISTONS.

1,290,819.  Specification of Letters Patent.  Patented Jan. 7, 1919.

Application filed February 21, 1918. Serial No. 218,480.

*To all whom it may concern:*

Be it known that I, NOLAN S. WILLIAMS, a citizen of the United States, residing at El Paso, in the county of El Paso and State of Texas, have invented certain new and useful Improvements in Metallic Packings for Pistons; and I do hereby declare the following to be a full, clear, and exact description of the invention, such as will enable others skilled in the art to which it appertains to make and use the same.

My present invention relates to improvements in metallic packings for pistons, and it is especially intended to provide a metallic packing for small high speed pistons for internal combustion engines, such as used on automobiles, aeroplanes, and the like.

This metallic packing is composed of three concentric rings, each of which is split at an incline, and the three rings acting in unison in the channel of the piston form a complete packing ring. The two outer rings in cross section are in the form of truncated wedges, and the central ring is in cross section somewhat similar to the form of a spool with the reversely disposed wedge faces adapted to engage the wedge faces of the outer rings. The wedge faces of the inner ring are cut away, as are also the wedge faces of the two outer rings, so as to provide grooves in which the oil, or other lubricant, used in lubricating the cylinder may be accumulated and may be forced outward. The outside rings have a greater expansion than the middle ring, thus keeping the middle ring in touch with the cylinder walls.

My invention will be more fully understood after reference to the accompanying drawings, in which like parts are indicated by similar reference symbols throughout the several views; and in which—

Figure 1 shows a central section through one end of the cylinder showing the piston partly in section and partly in elevation.

Fig. 2 is a perspective view showing the packing ring detached.

Fig. 3 shows a cross section through the packing ring along the line 3—3 of Figs. 1 and 2, and looking in the direction of the arrows, the parts being shown on a larger scale than in the other figures; and Fig. 4 shows parts of the three broken rings, which when united constitute the single packing ring comprising my invention.

A represents the cylinder chamber of the usual or any preferred construction; B represents the piston; C represents the piston rod; D represents the packing ring which is composed of three broken rings with the breaks $d$ staggered as shown in Fig. 2. These breaks are preferably cut at an angle relative to the axis of the ring so as to avoid scoring the cylinder.

The middle ring D' is spool shaped in cross section, having the annular wedge faces 1, 2, 3 and 4 connected together by the annular web 5, and the inner and outer faces 6 and 7 on the central ring D' engage, respectively, the inner wall of the cylinder and the bottom of the channel in the piston provided for the packing ring. The four corners 8, 9, 10 and 11 of the central ring are cut away or flattened, as shown most clearly in Fig. 3.

The outer rings $D^2$ have annular wedge faces 12 and 13 with a flat face 14 which projects into but does not quite reach the web 5 of the inner ring, the result being that there is a small channel for the lubricant between said web 5 and said face 14.

In a similar way there are four grooves left between the rings opposite the faces 8, 9, 10 and 11. Into these grooves the lubricant collects, and it is automatically squeezed out as the piston reciprocates incident to the ordinary operation of the engine.

These rings D' and $D^2$ are preferably made of spring steel and when distended are of greater diameter than the cylinder in which they will tend to spring outward and at all times form a tight joint. The outside rings are provided with a greater expansion than the inside ring, thus keeping the middle ring in touch with the cylinder walls.

In order to assemble the parts, assemble the ring members D' and $D^2$ in the position shown in Fig. 2, except that the cuts $d$ should all register, or approximately register, together; then the ring may be expanded like a single split ring to slip over the piston B and snap into ring channel $b$ provided in said piston. Now by sliding the outer ring members $D^2$ through an arc of approximately 120° in reverse directions, relative to the middle ring member D', the ring members are securely locked together and the wedge faces 12 will tend to wedge the middle ring outward, causing it to contact with the inner wall of the cylinder, but permitting accumulation of lubricant in the various grooves hereinbefore referred to.

The inner ring member will be prevented from being thrust out radially too far by means of its inner wedge faces 3 and 4. Thus it will be seen that these three ring members will positively interlock and will prevent accidental displacement outward of any one of the ring members and yet will permit the desired expansion and contraction of the packing ring as a whole.

The oil or other lubricant accumulates in the various passages, and as the piston reciprocates this oil is squeezed out toward the inner wall of the cylinder forming in effect two oil packing rings, which tend not only to keep the cylinder lubricated, but also serve to prevent the escape of gas from the pressure side of the piston to the exhaust side thereof.

It will be seen that the packing ring automatically adjusts itself for wear, and may be readily inserted and replaced if desired, does not burn out and assists in keeping the cylinder clean.

Having thus described my invention what I claim and desire to secure by Letters Patent of the United States is:—

1. A metallic piston packing comprising a middle split ring substantially spool shaped in cross section and provided with annular beveled faces formed by a web, the said middle ring having its outer face flattened and bearing directly against the inner wall of the cylinder, and two outer split rings each in the form of a truncated wedge in cross section, the faces of said wedge being adapted to engage the bevel sides of the middle ring, but to be spaced away from said web, the three rings together forming a substantially cylindrical ring adapted to fit in the ring channel of the piston, substantially as described.

2. A metallic piston packing comprising a middle split ring substantially spool shaped in cross section and provided with annular beveled faces formed by a web, the said middle ring having its outer face flattened and bearing directly against the inner wall of the cylinder, and two outer split rings each in the form of a truncated wedge in cross section, the faces of said wedge being adapted to engage the bevel sides of the middle ring, but to be spaced away from said web, and the bevel faces of said inner ring being cut away at their outer edges to form oil grooves, the three rings forming a substantially cylindrical ring adapted to fit in the ring channel of the piston, substantially as described.

3. A metallic piston packing comprising a middle split ring substantially spool shaped in cross section and provided with annular beveled faces formed by a web, the said middle ring having its outer face flattened and bearing directly against the inner wall of the cylinder, and two outer split rings each in the form of a truncated wedge in cross section, the faces of said wedge being adapted to engage the bevel sides of the middle ring, but to be spaced away from said web, the three rings together forming a substantially cylindrical ring adapted to fit in the ring channel of the piston, and the splits in the three rings being staggered whereby the three rings are held positively locked together, but are free to expand circumferentially, substantially as described.

4. A metallic piston packing comprising a middle split ring substantially spool shaped in cross section and provided with annular beveled faces formed by a web, the said middle ring having its outer face flattened and bearing directly against the inner wall of the cylinder, and two outer split rings each in the form of a truncated wedge in cross section, the faces of said wedge being adapted to engage the bevel sides of the middle ring, but to be spaced away from said web, and the bevel faces of said inner ring being cut away at their outer edges to form oil grooves, the three rings forming a substantially cylindrical ring adapted to fit in the ring channel of the piston, and the splits in the three rings being staggered whereby the three rings are held positively locked together, but are free to expand circumferentially, substantially as described.

In testimony whereof I affix my signature.

N. S. WILLIAMS.